April 17, 1928.
H. C. RASSMANN
1,666,791
WATER BOWL CONSTRUCTION FOR CATTLE
Filed Feb. 14, 1927    2 Sheets-Sheet 1
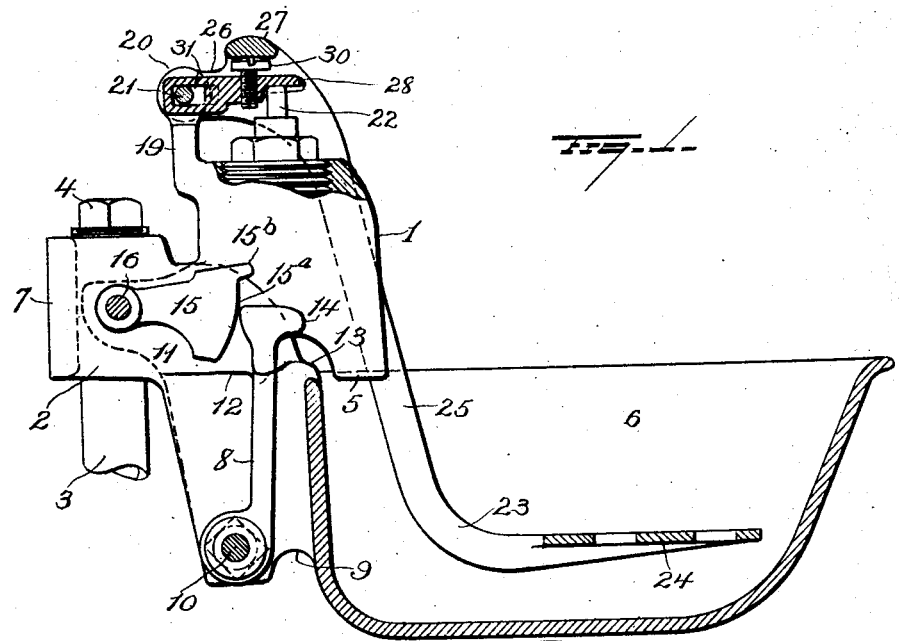
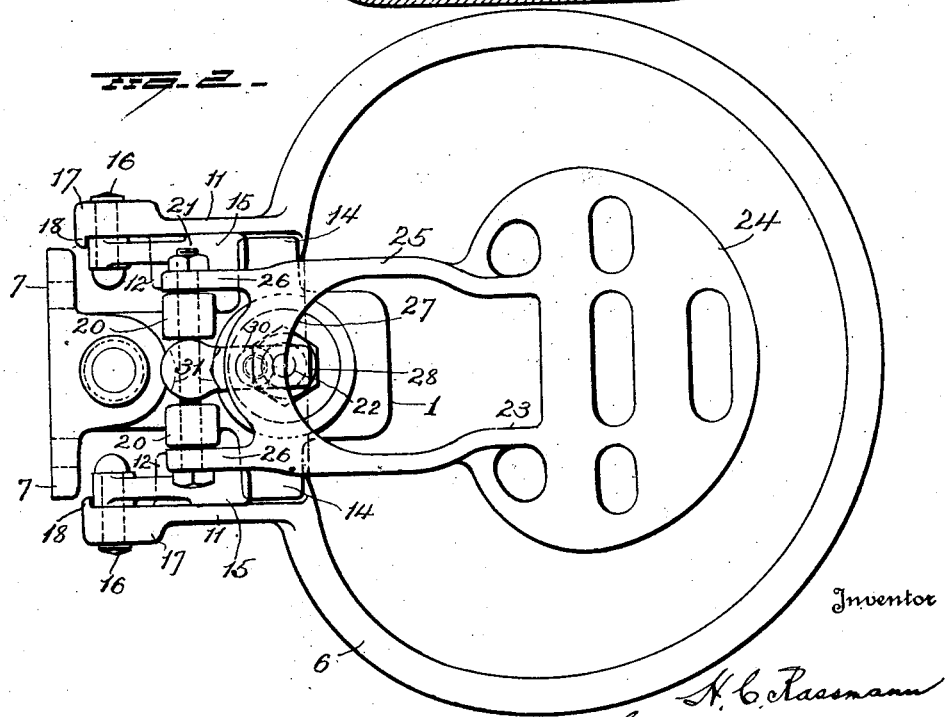

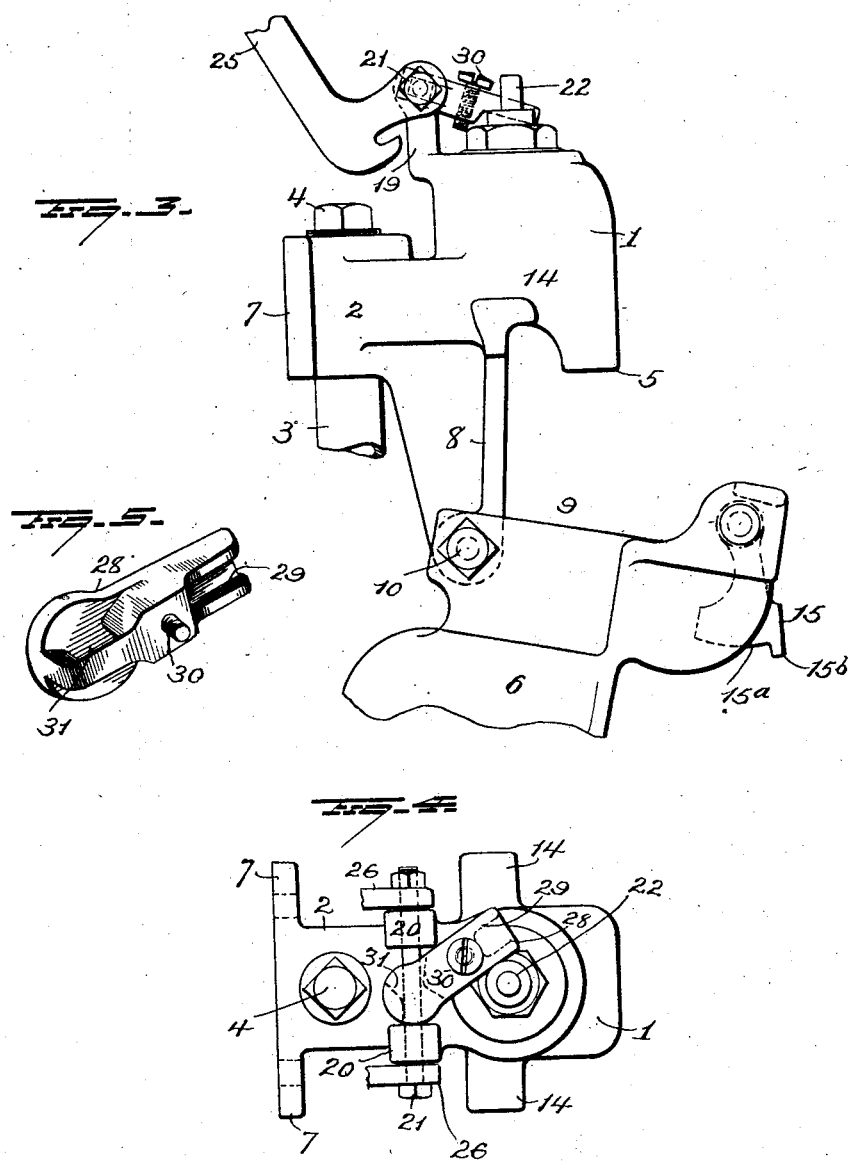

Patented Apr. 17, 1928.

1,666,791

UNITED STATES PATENT OFFICE.

HUGO C. RASSMANN, OF BEAVER DAM, WISCONSIN, ASSIGNOR TO F. RASSMANN MANUFACTURING COMPANY, OF BEAVER DAM, WISCONSIN.

WATER-BOWL CONSTRUCTION FOR CATTLE.

Application filed February 14, 1927. Serial No. 168,218.

This invention relates to improvements in water bowl construction for cattle,—one object of the invention being to provide improved means in a pivotally mounted bowl structure for normally latching the same in a horizontal position but which can be easily operated to release the bowl and permit it to swing to a vertical position, the latch devices being so arranged that they cannot be so operated by the animal as to release the bowl.

A further object is to provide simple and efficient adjustable means over the valved fount and normally operable by the animal operated lever to control the supply of water to the bowl.

With these and other objects in view, the invention consists in certain novel features of construction and combinations of parts as hereinafter set forth and pointed out in the claims.

In the accompanying drawings:—

Figure 1 is a sectional view of a watering bowl structure embodying my improvements;

Figure 2 is a plan view of the same;

Figure 3 is a view showing the lever and bowl in operative positions;

Figure 4 is a plan view, showing the valve operating member in inoperative position, and Figure 5 is a perspective view of the valve operating member.

In the drawings, a valved fount is shown at 1 and it is provided with a rearward hollow extension 2 to receive a stand pipe 3, and a plug 4 may be inserted into the upper end of said hollow extension, so that water from the stand pipe will be caused to flow through the valve fount and be discharged from the spout 5 thereof to a drinking bowl 6. If desired, the rearward extension 2 of the valved fount may be provided with lateral flanges 7 having suitable holes for the accommodation of fastening devices to secure the valved fount to a suitable support in proximity to the stand pipe.

The valve fount is provided with a depending arm 8 and the bowl 6 is provided with rearwardly projecting spaced brackets 9 between which the depending arm 8 is disposed and through the lower portions of which and the lower portion of said arm, a bolt or pin 10 passes to effect a pivotal connection of the bowl with the fount, so that said bowl may swing from a normal horizontal position (Fig. 1) to a vertical position (Fig. 3) when the bowl shall have been released by the manipulation of latch devices hereinafter described.

Brackets 11 project rearwardly from the bowl adjacent to and integral with the upper ends of the spaced brackets 9, shoulders 12 being formed between the brackets 9 and 11 and near their inner ends, the shoulders 12 are formed to provide abutments 13 to engage lugs or arms 14 projecting laterally from the valved fount and thus insure the proper horizontal position of the bowl when the latter is swung from the position shown in Figure 3 to the normal position shown in Figure 1, in which latter position, the bowl will be held by latches 15. These latches are pivotally supported by pins 16 carried by thickened portions 17 of the brackets 11, and said brackets may be provided at their rear ends with stop shoulders 18 to limit the backward throw of the latches. The latches 15 are made with curved edge portions 15$^a$ to engage the lugs or arms 14 and cause the abutments 13 to engage lugs or arms 14, and thus the bowl will be held steady in its normal position. Each latch 15 may be provided with a finger piece 15$^b$. It will be observed that the brackets 11 will protect the latches from interference by the animal.

The fount 1 is provided with upwardly projecting bifurcated bracket 19, respective members of the bifurcated portion of which form sleeves 20 to provide bearings for a bolt or pivot pin 21.

The operation of the valve of the valved fount (the stem of said valve being indicated at 22), is controlled by an animal operated lever 23, which comprises a platform 24 disposed within the bowl in position to be depressed by an animal, and a yoke portion 25 which partially embraces the valved fount, as shown in Figure 1. At its upper end, the yoke portion of the lever 23 is provided with arms 26 attached to the pivot bolt or pin 21 and said yoke portion is provided with a cross bar 27, the intermediate portion of which is preferably on a higher plane than that of the pivotal support of the lever. Interposed between the valve stem 22 and the cross bar 27 of the animal operated lever, is a valve-operating arm or member 28. This member is mounted loosely on the intermediate portion of the pivot bolt or pin 21 and is provided at or near its free end and in its under face, with a recessed seat 29 to receive the upper end of the valve stem 22. At an intermediate point, a screw 30 passes vertically through the member 28 and the head of this screw normally engages the under side of the cross bar 27 of the animal operated lever, so that when said lever is depressed by the animal, motion will be imparted through said screw 30 and the arm or member 28 to the valve stem to open the valve. By adjusting the screw, the lever may be so adjusted as to adjust the distance of the platform 24 relatively to the bottom of the bowl.

In order that the member 28 may be readily moved sidewise out of engagement with the valve stem to render the valve inoperable by the animal, said member 28 is provided with an enlarged opening 31 for the passage of the pivot bolt 21.

Having fully described my invention what I claim as new and desire to secure by Letters-Patent, is:—

1. The combination with a fount having a depending arm, of a bowl pivotally connected with said arm, a lateral lug on the valved fount, a part on the bowl to engage said lug, and a latch pivotally supported by a part on the bowl and adapted to engage said lug opposite engagement of the part on the bowl with the latter.

2. The combination with a fount having a depending arm, of a bowl having spaced rearwardly projecting brackets receiving said arm between them, means pivotally connecting the lower portion of said brackets with the lower portion of said arm, lateral lugs on the fount, brackets on the bowl, latches located inwardly of said last-mentioned brackets and pivotally attached thereto, said latches adapted to engage the lateral lugs on the fount, and abutments on the bowl to engage said lateral lugs approximately opposite engagement of the latches therewith.

3. The combination with a valved fount and a bowl supported thereby, of an animal operated lever pivotally supported by and over the valved fount, and having a part to be disposed within the bowl, and a pivoted laterally shiftable arm disposed between the valve stem of the valved fount and a part on the animal operated lever near the pivotal support of the latter over the valved fount.

4. The combination with a valved fount and a bowl to be supported thereby, of a bifurcated bracket projecting upwardly from the fount, an animal operated lever having a part to be disposed in the bowl, arms on the upper portion of said lever, a cross bar intermediate of the arms on the lever, a pivot bolt passing through the bifurcated arm on the fount, and a member mounted on said pivot bolt and disposed between the stem of the valve of the valved fount and the cross bar of the animal operated lever, said member having an enlarged opening for the passage of the pivot bolt, whereby said member may be shifted out of operative relation to the valve stem.

In testimony whereof, I have signed this specification.

HUGO C. RASSMANN.